United States Patent
Li et al.

(10) Patent No.: US 10,270,979 B2
(45) Date of Patent: Apr. 23, 2019

(54) AUTOMATICALLY DEPTH-OF-FIELD ADJUSTING METHOD AND CAMERA

(71) Applicant: VIVOTEK INC., New Taipei (TW)

(72) Inventors: Wen-Yuan Li, New Taipei (TW); Shih-Hsuan Hung, New Taipei (TW)

(73) Assignee: VIVOTEK INC., New Taipei (TW)

( * ) Notice: Subject to any disclaimer, the term of this patent is extended or adjusted under 35 U.S.C. 154(b) by 0 days.

(21) Appl. No.: 15/916,232

(22) Filed: Mar. 8, 2018

(65) Prior Publication Data

US 2018/0270425 A1 Sep. 20, 2018

(30) Foreign Application Priority Data

Mar. 14, 2017 (TW) .............................. 106108281 A

(51) Int. Cl.
*G03B 7/08* (2014.01)
*H04N 5/232* (2006.01)
*H04N 5/235* (2006.01)

(52) U.S. Cl.
CPC ............ *H04N 5/23296* (2013.01); *G03B 7/08* (2013.01); *H04N 5/2351* (2013.01)

(58) Field of Classification Search
CPC .... G03B 7/08; H04N 5/23296; H04N 5/2351; H04N 13/128; H04N 13/204; H04N 13/243; H04N 13/271; H04N 2013/0081; H04N 5/23212; G06T 7/571; G06T 7/593
See application file for complete search history.

(56) References Cited

U.S. PATENT DOCUMENTS

| | | | | |
|---|---|---|---|---|
| 8,946,636 | B2* | 2/2015 | Afrooze | H05B 33/0842 250/338.1 |
| 2011/0080487 | A1* | 4/2011 | Venkataraman | H04N 5/2253 348/218.1 |
| 2015/0381965 | A1* | 12/2015 | Atanassov | H04N 5/23245 348/47 |
| 2016/0044253 | A1* | 2/2016 | Dainty | G02B 5/3025 348/349 |
| 2016/0050407 | A1* | 2/2016 | Chen | H04N 5/23212 348/47 |
| 2017/0034456 | A1* | 2/2017 | Kyung | H04N 5/332 |
| 2018/0197275 | A1* | 7/2018 | Price | G06T 3/403 |

FOREIGN PATENT DOCUMENTS

CN 102162978 A 8/2011

* cited by examiner

*Primary Examiner* — Amy R Hsu
(74) *Attorney, Agent, or Firm* — Winston Hsu

(57) ABSTRACT

A camera using an automatically depth-of-field adjusting method includes a camera lens, a diaphragm, a light-sensing part, and a controller. The light-sensing part can receive visible light of a first wave band and invisible light of a second wave band. The controller performs an adjusting procedure, according to which the controller measures a first light intensity of ambient light of a scene relative to the first wave band and a second light intensity of the ambient light relative to the second wave band, and when the controller determines that a ratio of a difference between the first intensity and the second intensity to a sum of the first intensity and the second intensity is less than a predetermined value, controls the diaphragm to adjust an aperture of the diaphragm according to a current focal length of the camera lens.

13 Claims, 4 Drawing Sheets

AUTOMATICALLY DEPTH-OF-FIELD ADJUSTING METHOD AND CAMERA

BACKGROUND OF THE INVENTION

1. Field of the Invention

The invention relates to a camera and a depth-of-field adjusting method therefor, and especially relates to a method of adjusting the depth of field of a camera according to the content of received light, and a camera using the method.

2. Description of the Prior Art

Outdoor surveillance cameras usually work all day. They usually use the same camera lens for capturing images. During the daytime, the camera takes sunlight as the light source of image. During the nighttime, there is no enough sunlight, so infrared is used as the light source of image. Since different wavelengths have different indexes of refraction, images formed by different light source of different wavelengths will not be located at the same position on the optical axis of the camera lens. In general, during the daytime, the visible light is relatively strong while the invisible light is relatively weak, so the camera can obtain clear images by the visible light. During the nighttime, the visible light is obviously inadequate, so the camera obtains clear images formed by auxiliary light (i.e. infrared). However, at dusk, although the sunlight is not enough for obtaining clear images, the auxiliary light (i.e. infrared) still cannot be much stronger than the current sunlight. Therefore, no matter how the camera captures an image by the sunlight or the infrared, the image is still affect by the other light, result in a blurry image. Furthermore, even though a common autofocusing method is implemented, the camera still cannot capture a clear image that is formed by the sunlight and the infrared. In the above two cases, the function of video surveillance of the outdoor surveillance cameras will probably fail at dusk (or the time at which the sunlight and the infrared are about the same).

SUMMARY OF THE INVENTION

An objective of the invention is to provide an automatically depth-of-field adjusting method for a camera, which analyzes the components of light received by the camera and adjusts the depth of field of the camera according to the components of the light, so as to obtain more clear images.

An automatically depth-of-field adjusting method according to the invention is used for a camera. The camera includes a light-sensing part, a camera lens, a diaphragm, and a controller. The controller is electrically connected to the light-sensing part and the diaphragm. The diaphragm has an aperture corresponding to the camera lens. The light-sensing part can receive visible light of a first wave band and invisible light of a second wave band. The automatically depth-of-field adjusting method includes the following steps: (a) the controller measuring a first light intensity of ambient light of a scene relative to the first wave band and a second light intensity of the ambient light of the scene relative to the second light intensity through the light-sensing part; and (b) when the controller determines that a ratio of a difference between the first intensity and the second intensity to a sum of the first intensity and the second intensity is less than a predetermined value, the controller controlling the diaphragm to adjust the aperture according to a current focal length of the camera lens. Therefore, when a proportion of visible light in the light received by the light-sensing part and a proportion of invisible light in the light are about the same (or a difference between the two proportions is not large enough), the automatically depth-of-field adjusting method will change the depth of field of the camera by adjusting the aperture of the diaphragm, so as to obtain more clear images.

Another objective of the invention is to provide a camera, which analyzes the components of light received by the camera and adjusts the depth of field of the camera according to the components of the light, so as to obtain more clear images.

A camera according to the invention includes a camera lens, a diaphragm, a light-sensing part, and a controller. The diaphragm has an aperture corresponding to the camera lens. The light-sensing part can receive visible light of a first wave band and invisible light of a second wave band. The controller is electrically connected to the light-sensing part and the diaphragm. Therein, the controller executes an adjusting procedure. According to the adjusting procedure, the controller measures a first light intensity of ambient light of a scene relative to the first wave band and a second light intensity of the ambient light of the scene relative to the second wave band through the light-sensing part, and when the controller determines that a ratio of a difference between the first intensity and the second intensity to a sum of the first intensity and the second intensity is less than a predetermined value, the controller controls the diaphragm to adjust the aperture according to a current focal length of the camera lens. Therefore, when a proportion of visible light in the light received by the light-sensing part and a proportion of invisible light in the light are about the same (or a difference between the two proportions is not large enough), the camera will change the depth of field of the camera by adjusting the aperture of the diaphragm, so as to obtain more clear images.

Compared with the prior art, when the proportions of the visible light and the invisible light in the ambient light are about the same, the automatically depth-of-field adjusting method and the camera according to the invention can adjust the aperture of the diaphragm according to the current focal length of the camera lens, so that the camera can capture more clear images that are formed by both the visible light and the invisible light. Therefore, the invention can solve the problem in the prior art that when the sunlight and the infrared are about the same, the images captured by an outdoor surveillance camera will be blurry.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
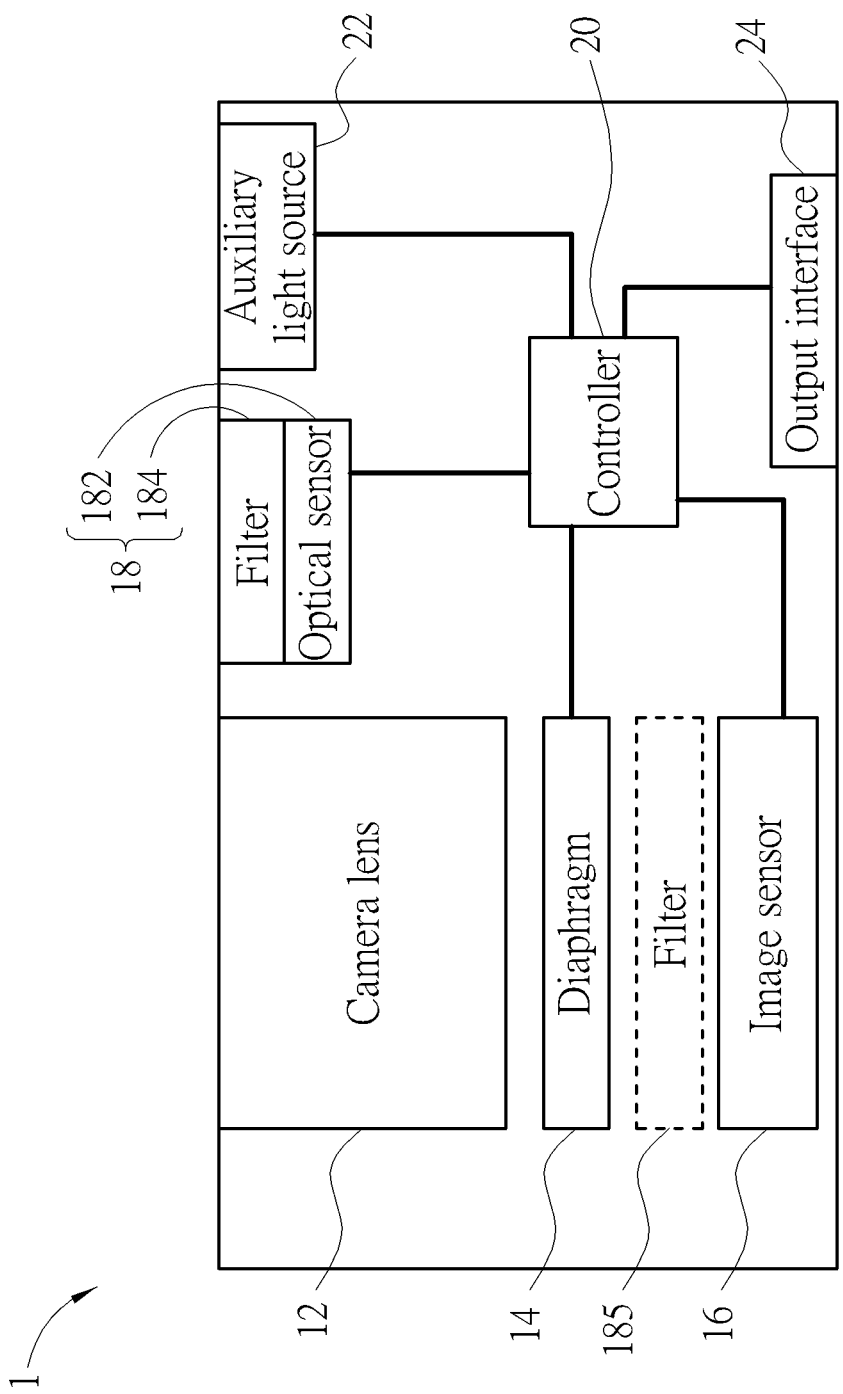
FIG. 1 is a functional block diagram of a camera of an embodiment according to the invention.

Please refer to FIG. 1. A camera 1 of an embodiment according to the invention includes a camera lens 12, a diaphragm 14, an image sensor 16, a light-sensing part 18, and a controller 20. The controller 20 is electrically connected to the diaphragm 14, the image sensor 16, and the light-sensing part 18. After external light (or ambient light relative to the camera 1) enters the camera 1 from the camera lens 12, the external light passes through the diaphragm 14 to reach the image sensor 16. The controller 20 analyzes sensed signals of the image sensor 16 to form an image. The diaphragm 14 is disposed on the optical path of the external light before the external light reaches the image sensor 16. The diaphragm 14 has an aperture corresponding to the camera lens 12. The aperture is used to limit the amount of the external light passing through the diaphragm 14. Furthermore, the camera 1 further includes an auxiliary light source 22 electrically connected to the controller 20. When the external ambient light is insufficient, the controller 20 can control the auxiliary light source 22 to emit auxiliary light (as additional ambient light relative to the camera 1), for example but not limited to infrared of invisible light (e.g. emitted by an infrared LED), so that the image sensor 16 still can receive enough external light to form images. Furthermore, in the embodiment, the camera 1 further includes an output interface 24 electrically connected to the controller 20 and used for communicating with an external electronic device. The controller 20 can analyze sensed signals by the image sensor 16 to form images and send the images through the output interface 24 to the external electronic device, e.g. network servers, displays and so on. In addition, the camera 1 can be provided with a power source installed therein or be powered by an external power source (e.g. through the output interface 24, that is structurally integrated with an input interface for an external battery).

Furthermore, in practice, the camera lens 12 can be a combination of a plurality of lenses. The camera 1 includes an adjusting mechanism accordingly for adjusting the relative positions of the lenses so that the focal length of the camera lens 12 is variable. In other words, the camera lens 12 is a zoom camera lens. In this case, the camera lens 12 and the adjusting mechanism can be structurally integrated into a camera lens device. In practice, the adjusting mechanism can include a driving motor that is electrically connected to the controller 20 and is controlled by the controller 20. Thereby, the controller 20 can drive the adjusting mechanism through the driving motor to adjust the relative positions of the lenses.

In practice, the aperture of the diaphragm 14 can be formed by but not limited to a plurality of rotatable blades (e.g. iris diaphragm). In this case, the diaphragm 14 can include a driving motor kinetically connected to the rotatable blades so as to control the size of the aperture. Furthermore, in practice, the diaphragm 14 can be disposed to be integrated with the camera lens 12, for example, disposed between the lenses. It is added that in FIG. 1, the diaphragm 14 is shown only for indicating that the external light will pass through the diaphragm 14 after entering the camera lens 12 before reaching the image sensor 16. The configuration shown by FIG. 1 does not limit the diaphragm 14 to be required to be disposed independently from and between the camera lens 12 and the image sensor 16.

In practice, the image sensor 16 can be realized by but not limited to a charge-coupled device (CCD) having a filter array thereon. In this case, a shutter of the camera 1 can be realized by the image sensor 16. Thereby, the controller 20 controls the shutter at the same time when the controller 20 controls the image sensor 16 to capture an image. However, the invention is not limited thereto. In addition, in practice, the controller 20 can be realized by a microcontroller unit (MCU) or a system on chip (SOC).

In the embodiment, the light-sensing part 18 is independent from the image sensor 16. The light-sensing part 18 can sense visible light of a first wave band and invisible light of a second wave band. Therein, the first waveband can be but not limited to 400 nm to 700 nm; the second wave band can be but not limited to 800 nm to 900 nm. In the embodiment, the light-sensing part 18 includes an optical sensor 182 and a filter 184 disposed on the optical sensor 182. The optical sensor 182 is electrically connected to the controller 20. When the filter 184 is located in front of the optical sensor 182 (or covering the optical sensor 182), light will be filtered by the filter 184 and then be received by the optical sensor 182. In practice, the filter 184 can be movably disposed on the optical sensor 182, so that when the filter 184 is moved away, the optical sensor 182 still can receive visible light of the first wave band and invisible light of the second wave band. In other words, the controller 20 can measure light intensities of light in different compositions through the light-sensing part 18 and further obtain a light intensity of the union excluding the intersection of two light compositions by a subtraction of two corresponding measurement results. Thereby, the controller 20 can easily obtain the light intensities of light in required compositions. Furthermore, in practice, the filter 184 can be moved by a simple sliding mechanism. For example, the filter 184 slides in a sliding slot and is kinetically connected to a driving motor (electrically connected to the controller 20), so that the controller 20 can switch the position of the filter 184.

Figure 2:
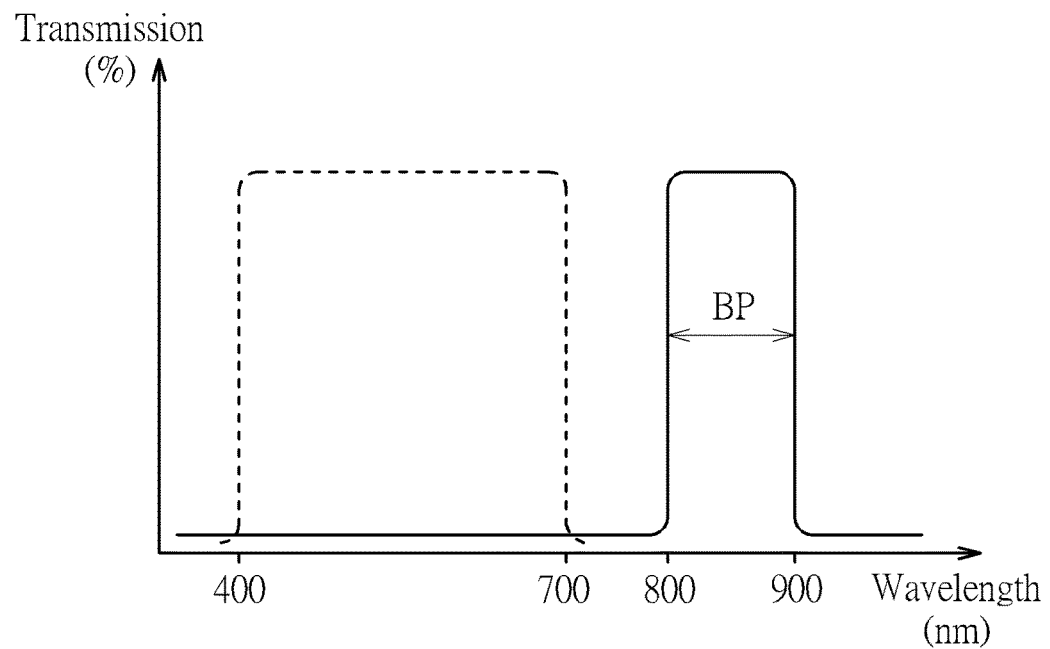
FIG. 2 is a diagram of the transmission spectrum of a filter used for a light-sensing part of the camera in FIG. 1 according to an embodiment.

Furthermore, for simplification of the description of the embodiment, the following is based on that the optical sensor 182 only can sense visible light of the first wave band and invisible light of the second wave band (in practice, which can be realized due to its sensing characteristics of the optical sensor 182 or by disposing an additional filter array thereon); however, the invention is not limited thereto. In an embodiment, the filter 184 is a band-pass filter, of which the transmission spectrum is shown by FIG. 2. A band-pass wave band BP of the band-pass filter is substantially the same as the second wave band. Therefore, invisible light in the range of 800 nm to 900 nm can pass through the filter 184 to be received by the optical sensor 182; light not in the above range, including visible light in the range of 400 nm to 700 nm (as the range indicated by dashed lines in FIG. 2), will be blocked by the filter 184 so as not to be received by the optical sensor 182. Thereby, when the filter 184 is located in front of the optical sensor 182, the optical sensor 182 only can receive the invisible light in the range of 800 nm to 900 nm, so that the controller 20 can measure a light intensity of the light entering the light-sensing part 18 relative to the second wave band through the optical sensor 182 (i.e. the light intensity of the invisible light in the range of 800 nm to 900 nm). When the filter 184 is moved away from the front of the optical sensor 182, the optical sensor 182 can receive the visible light in the range of 400 nm to 700 nm and the invisible light in the range of 800 nm to 900 nm, so that the controller 20 can measure a light intensity of the light entering the light-sensing part 18 relative to the first wave band and the second wave band through the optical sensor 182 (i.e. the light intensity of the visible light in the range of 400 nm to 700 nm and the invisible light in the range of 800 nm to 900 nm). A subtraction of the two measured light intensities results in a light intensity relative to the first wave band (i.e. the light intensity of the visible light in the range of 400 nm to 700 nm). It is added that from another aspect, when the filter 184 is moved away from the front of the optical sensor 182, the measured light intensity by the controller 20 through the optical sensor 182 contains the light intensity relative to the first wave band; in other words, the controller 20 also measures the light intensity of the ambient light relative to the first wave band at the same time. The above subtraction is used to extract the light intensity relative to the first wave band from the measured light intensity. The above explanation for the measured light intensity will also applied in the following and will not be repeated in addition.

In addition, in practice, the band-pass filter can be chosen so that the band-pass wave band BP is substantially the same as the first wave band. In this case, visible light in the range of 400 nm to 700 nm can pass through the filter 184 to be received by the optical sensor 182; light not in the above range, including invisible light in the range of 800 nm to 900 nm, will be blocked by the filter 184 so as not to be received by the optical sensor 182. Similarly, the controller 20 can measure a light intensity of light entering the light-sensing part 18 relative to the first wave band and the second wave band and a light intensity of the light relative to the first wave band through the optical sensor 182; further, the controller 20 can obtain a light intensity relative to the second wave band by a subtraction of the two measured light intensities.

Figure 3:
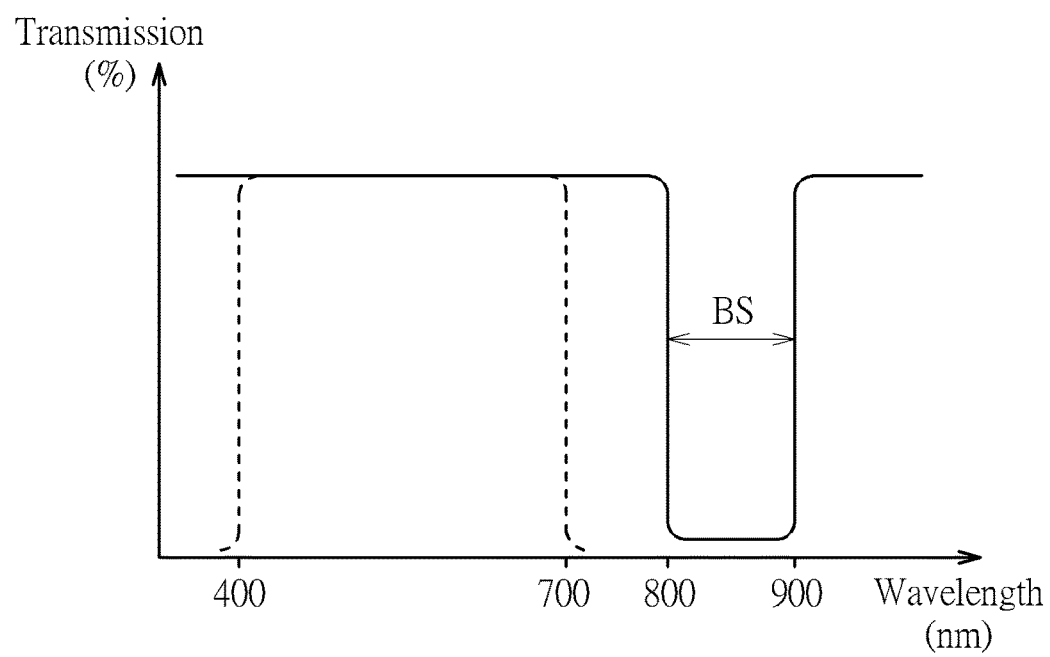
FIG. 3 is a diagram of the transmission spectrum of a filter used for the light-sensing part of the camera in FIG. 1 according to another embodiment.

In another embodiment, the filter is a band-stop filter, of which the transmission spectrum is shown by FIG. 3. A band-stop wave band BS of the band-pass filter is substantially the same as the second wave band. Therefore, invisible light in the range of 800 nm to 900 nm will be blocked by the filter 184 so as not to be received by the optical sensor 182; light not in the above range, including visible light in the range of 400 nm to 700 nm (as the range indicated by dashed lines in FIG. 3), can pass through the filter 184 so as to be received by the optical sensor 182. Thereby, when the filter 184 is located in front of the optical sensor 182, the optical sensor 182 can receive light (including visible light in the range of 400 nm to 700 nm) excluding 800 nm to 900 nm, so that the controller 20 can measure a light intensity of the light entering the light-sensing part 18 relative to the first wave band through the optical sensor 182 (i.e. the light intensity of the visible light in the range of 400 nm to 700 nm). When the filter 184 is moved away from the front of the optical sensor 182, the optical sensor 182 can receive the visible light in the range of 400 nm to 700 nm and the invisible light in the range of 800 nm to 900 nm, so that the controller 20 can measure a light intensity of the light entering the light-sensing part 18 relative to the first wave band and the second wave band through the optical sensor 182 (i.e. the light intensity of the visible light in the range of 400 nm to 700 nm and the invisible light in the range of 800 nm to 900 nm). A light intensity relative to the second wave band (i.e. the light intensity of the invisible light in the range of 800 nm to 900 nm) can be obtained by a subtraction of the two measured light intensities.

In addition, in practice, the band-stop filter can be chosen so that the band-stop wave band BS is substantially the same as the first wave band. In this case, visible light in the range of 400 nm to 700 nm will be blocked by the filter 184 so as not to be received by the optical sensor 182; light not in the above range, including invisible light in the range of 800 nm to 900 nm, can pass through the filter 184 so as to be received by the optical sensor 182. Similarly, the controller 20 can measure a light intensity of light entering the light-sensing part 18 relative to the first wave band and the second wave band and a light intensity of the light relative to the second wave band through the optical sensor 182; further, the controller 20 can obtain a light intensity relative to the first wave band by a subtraction of the two measured light intensities.

In the embodiment, when the camera 1 is in operation, the controller 20 will execute an adjusting procedure. According to the adjusting procedure, the controller 20 measures a first light intensity of ambient light of a scene (i.e. the location monitored by the camera 1) relative to a first wave band and a second light intensity of ambient light of the scene relative to second wave band. When the controller 20 determines that a ratio of a difference between the first intensity and the second intensity to a sum of the first intensity and the second intensity is less than a predetermined value, the controller 20 controls the diaphragm 14 to adjust the aperture of the diaphragm 14 according to a current focal length of the camera lens 12. From another aspect, due to different wavelengths have different indexes of refraction, so it is difficult to make the light of different wavelengths form clear images at the same image plane when the external light passes through the camera lens 12 to reach the image sensor 16. When light intensities of the ambient light relative to different wave bands are close (i.e. a case of the ratio being less than the predetermined value), light relative to different wave bands all affect image capturing of the image sensor 16. If an image based on the light relative to one of the wave bands is used for the image sensor 16 to capture, since different wavelengths have different indexes of refraction, the light relative other wave bands will form images at the different image planes. If the location of image plane is out of the depth of field of the camera lens, the image captured by the image sensor 16 from the light relative the other wave bands will be blurry, so that an actual image obtained by the controller 20 through the image sensor 16 will be blurry. For this case, the controller 20 in the embodiment will control the diaphragm 14 to adjust the aperture of the diaphragm 14 for changing the depth of field of the camera lens according to the current focal length of the camera lens 12, so that the image planes for the light relative to every wave band can be located within the depth of field of the camera lens, and so that the light relative to every wave band can form a relatively clear image on the image sensor 16; that is, the controller 20 can obtain a relatively clear image through the image sensor 16.

In a practical application, the camera 1 can be an outdoor surveillance camera. The camera 1 can operate in a daytime mode and a nighttime mode. In the daytime mode, the controller 20 turns off the auxiliary light source 22. In the nighttime mode, the controller 20 turns on the auxiliary light source 22 to provide auxiliary light (e.g. infrared). A mode change (i.e. a change between day and night) can occur at dusk or daybreak (which can be set and stored in the controller 20 according to weather information), at which the controller 20 can automatically change the operation status of the auxiliary light source 22 accordingly. At dusk, the camera 1 enters the nighttime mode, and the controller 20 controls the auxiliary light source 22 to emit auxiliary light (i.e. infrared in the range of 800 nm to 900 nm in the embodiment). At the time, sunlight is insufficient, so in principle, the ambient light received by the camera 1 is composed of visible light (i.e. the sunlight) and invisible light (i.e. the infrared), and the light intensity of visible light may be not much different from the light intensity of invisible light. By the controller 20 executing the adjusting procedure, the depth of field of the camera lens 12 is adjusted accordingly, so that both the visible light and the invisible light can form relatively clear images on the image sensor 16; thereby, the camera 1 still can perform the surveillance function at dusk. Similarly, at daybreak, the camera 1 may still operate in the nighttime mode. At the time, the sunlight appears but is insufficient. In principle, the ambient light received by the camera 1 composed of visible light (i.e. the sunlight) and invisible light (i.e. the infrared) which roughly have no much difference therebetween. By the controller 20 executing the adjusting procedure, the depth of field of the camera lens 12 is adjusted accordingly, so that the controller 20 controls the image sensor 16 to capture relatively clear images; thereby, the camera 1 still can perform the surveillance function at daybreak.

In other practice applications, e.g. in a night surveillance of a location with a street lamp, the camera 1 may receive visible light form the street lamp. The light intensity of the visible light form the street lamp maybe not much different from the light intensity of the infrared from the auxiliary light source 22 (e.g. a case that the ratio is less than the predetermined value). The camera 1 also can adjust the depth of field of the camera lens 12 by the controller 20 executing the adjusting procedure, so that the controller 20 still can control the image sensor 16 to capture relatively clear images. For another example, in an indoor surveillance of an indoor place with local and insufficient illumination, the camera 1 also can obtain relatively clear images captured by the sensor 16 by the controller 20 executing the adjusting procedure.

Furthermore, the execution details of the controller 20 measuring the first light intensity and the second light intensity can refer to the relevant descriptions in the foregoing and will not be repeated in addition. In sum, when the filter 184 is a band-pass filter, the ambient light passes through the band-pass filter to be received by the optical sensor 182 for measuring the second light intensity; when the filter 184 is a band-stop filter, the ambient light passes through the band-stop filter to be received by the optical sensor 182 for measuring the first light intensity. Furthermore, in practice, the predetermined value can be set to be but not limited to 0.4. The threshold value can be determined according to the blurry degree of image that is predetermined to be accepted by users. The adjustment in the size of the aperture of the diaphragm 14 can be implemented through a look-up table that can be stored in the controller 20 in advance. In practice, the look-up table is formed by experiment. The contents of the look-up table include a plurality of reference focal length ranges obtained by dividing a zoom focal length range (or an variable range of the focal length) of a zoom camera lens. Each reference focal length range corresponds to one aperture. The controller 20 compares the focal length of the camera lens 12 with the reference focal length ranges to determine the reference focal length range to which the current focal length of the camera lens 12 corresponds. Then, the controller 20 looks up the aperture corresponding to the determined reference focal length range. Then, the controller 20 adjusts the aperture of the diaphragm 14 according to the looked-up aperture. In addition, it is added that in the embodiment, when the controller 20 adjusts the aperture according to the adjusting procedure, automatic exposure (AE) will not be involved, but adjustment of gain and exposure time is made in coordination with the aperture for reaching a brightness that makes a captured image visual.

In the above embodiments, the light-sensing part 18 and the image sensor 16 are disposed separately, so even when the camera 1 continuously records (that is, the controller 20 controls the image sensor 16 to capture successive images of the scene), the controller 20 can also execute the above adjusting procedure simultaneously; however, the invention is not limited thereto. For example, the image sensor 16 can also be used as the optical sensor 182 of the light-sensing part 18. A filter 185 (shown by a rectangle in dashed lines in FIG. 1) is movably disposed above the image sensor 16 in addition (which in logic, is equivalent to that the filter 184 is moved to a position above or in front of the image sensor 16). The controller 20 can determine the first light intensity and the second light intensity by controlling the image sensor 16 and the filter 185. For example, when the controller 20 controls the image sensor 16 to capture a plurality of successive images of the scene, the controller 20 can control the location of the filter 185 so as to correspondingly determine the first light intensity according to one of the successive images and the second light intensity according to another of the successive images. Furthermore, the images for the determination of the light intensities may involve color distortion (because the light for forming the images has been filtered by the filter 185) and therefore, can be removed without being outputted. In other words, the controller 20 will remove the two images for the determination of the first light intensity and the second light intensity from the successive images and output the rest images through the output interface 24.

For more details, in practice, if the filter 185 has only one band-pass filter portion (e.g. of which the band-pass wave band is substantially the same as the second wave band), the controller 20 controls the filter 185 to make the band-pass filter portion cover the image sensor 16, so that the ambient light is filtered by the band-pass filter portion to be received by the image sensor 16. For this case, the controller 20 determines the second light intensity according to the image signals from the image sensor 16. The controller 20 can control the filter 185 to make the band-pass filter portion move away from the image sensor 16, so that the ambient light is directly received by the image sensor 16. For this case, the controller 20 determines a light intensity including the first light intensity and the second light intensity according to the image signals from the image sensor 16. The above determined second light intensity subtracts from this light intensity to obtain the first light intensity. Similarly, if the filter 185 only has a band-stop filter portion (e.g. of which the band-stop wave band is substantially the same as the second wave band), the controller 20 can determine the first light intensity and the second light intensity in a way similar to the above processing procedure, which will not be described in detail. In addition, in practice, the above band-pass wave band and the above band-stop wave band can be set to be other wave bands, e.g. equal to the first wave band.

Furthermore, in practice, if the filter 185 has two band-pass filter portions (e.g. of which the band-pass wave band is substantially to the first wave band and the second wave band), the controller 20 controls the filter 185 to make the band-pass filter portion, of which the band-pass wave band is substantially to the first wave band, cover the image sensor 16, so that the ambient light is filtered by this band-pass filter portion to be received by the image sensor 16; then, the controller 20 determines the first light intensity according to the image signals from the image sensor 16.

The controller 20 controls the filter 185 to make the band-pass filter portion, of which the band-pass wave band is substantially to the second wave band, cover the image sensor 16, so that the ambient light is filtered by this band-pass filter portion to be received by the image sensor 16; then, the controller 20 determines the second light intensity according to the image signals from the image sensor 16. Similarly, if the filter 185 has two band-stop filter portions (e.g. of which the band-stop wave band is substantially to the first wave band and the second wave band), the controller 20 can determine the first light intensity and the second light intensity in a way similar to the above processing procedure, which will not be described in detail.

In addition, in the above embodiments, the whole image captured by the image sensor 16 is analyzed for the light intensity; however, the invention is not limited thereto. For example, in an actual surveillance application, not all the scene needs to be clearly monitored. For most cases, maybe only one portion of the scene is significant and can be set to be a region of interest. Then, the analysis for the light intensity is executed on the image corresponding to the region of interest. For more details, in practice, a first image block of a first image of the scene captured by the image sensor 16 is analyzed; then, the first light intensity is determined according to the first image block. A second image block of a second image of the scene captured by the image sensor 16 is analyzed; then, the second light intensity is determined according to the second image block. Therein, the two image blocks correspond to the same region of interest of the scene. In the embodiment, except for the analysis on the blocks of the images for the light intensities, the process procedure of how to use the filter to selectively filter light to form the two image blocks and then to analysis of the light intensities according to the two image blocks is substantially equal to that in the above embodiments and refers to the foregoing, which will not be described in addition.

Figure 4:
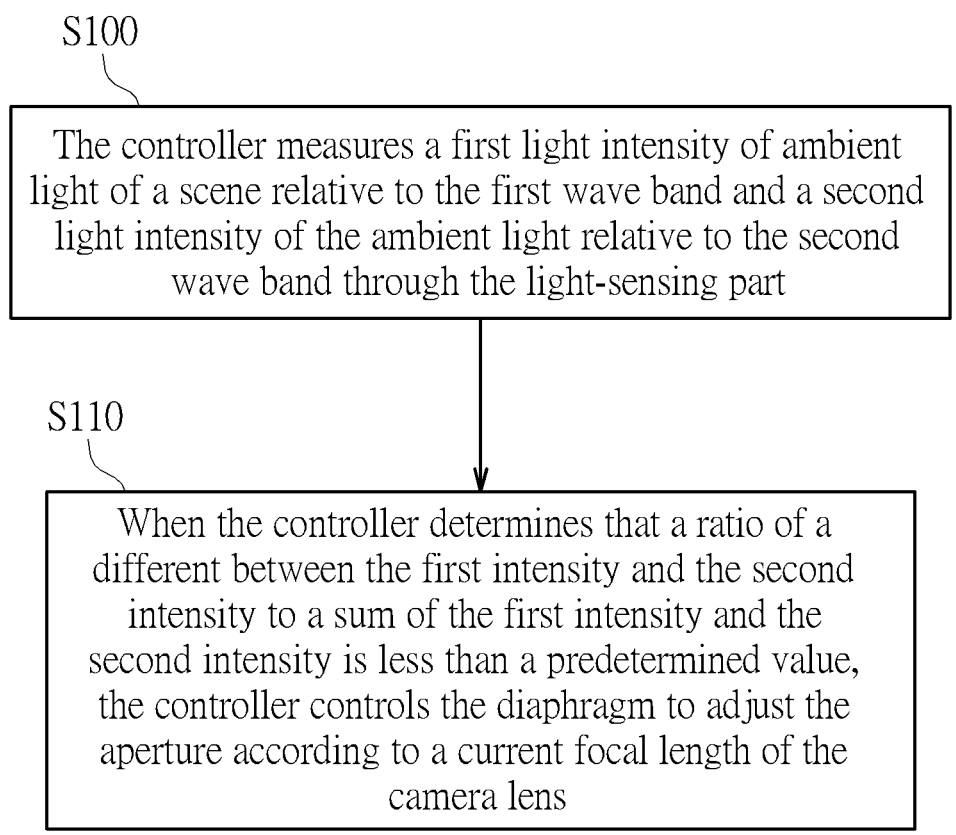
FIG. 4 is a flowchart of an automatically depth-of-field adjusting method according to the invention.

As described in the foregoing, the camera 1 according to the invention and the variations thereof can execute the adjusting procedure; that is, when the received visible light and the received invisible light have no much difference therebetween in intensity, the controller 20 adjusts the aperture of the diaphragm 14 to change the depth of field of the camera lens 12, so that the light relative to every wave bands can form a relatively clear image on the image sensor 16. Thereby, the controller 20 can obtain relatively clear images through the image sensor 16. In practice, the controller 20 can be set to execute the adjusting procedure at predefined time intervals (e.g. every half hour) or at least one specific time point (e.g. the time when day and night exchange), which achieves a dynamically adjusting effect. Please refer to FIG. 4, which is a flowchart of an automatically depth-of-field adjusting method according to the invention. For simplification of description, the following is based on that the automatically depth-of-field adjusting method is practiced on the camera 1. For the relevant descriptions of the camera 1 (including the disposition and action of the components thereof and the variations), please refer to the foregoing and relevant figures, which will not be repeated in addition. As shown by FIG. 4, the automatically depth-of-field adjusting method is to use the controller 20 to measure a first light intensity of ambient light of a scene relative to the first wave band and a second light intensity of the ambient light relative to the second wave band through the light-sensing part 18, as shown by the step S100. When the controller 20 determines that a ratio of a difference between the first intensity and the second intensity to a sum of the first intensity and the second intensity is less than a predetermined value (e.g. 0.4, mentioned above), the controller 20 controls the diaphragm 14 to adjust the aperture according to a current focal length of the camera lens 12, as shown by the step S110.

Figure 5:
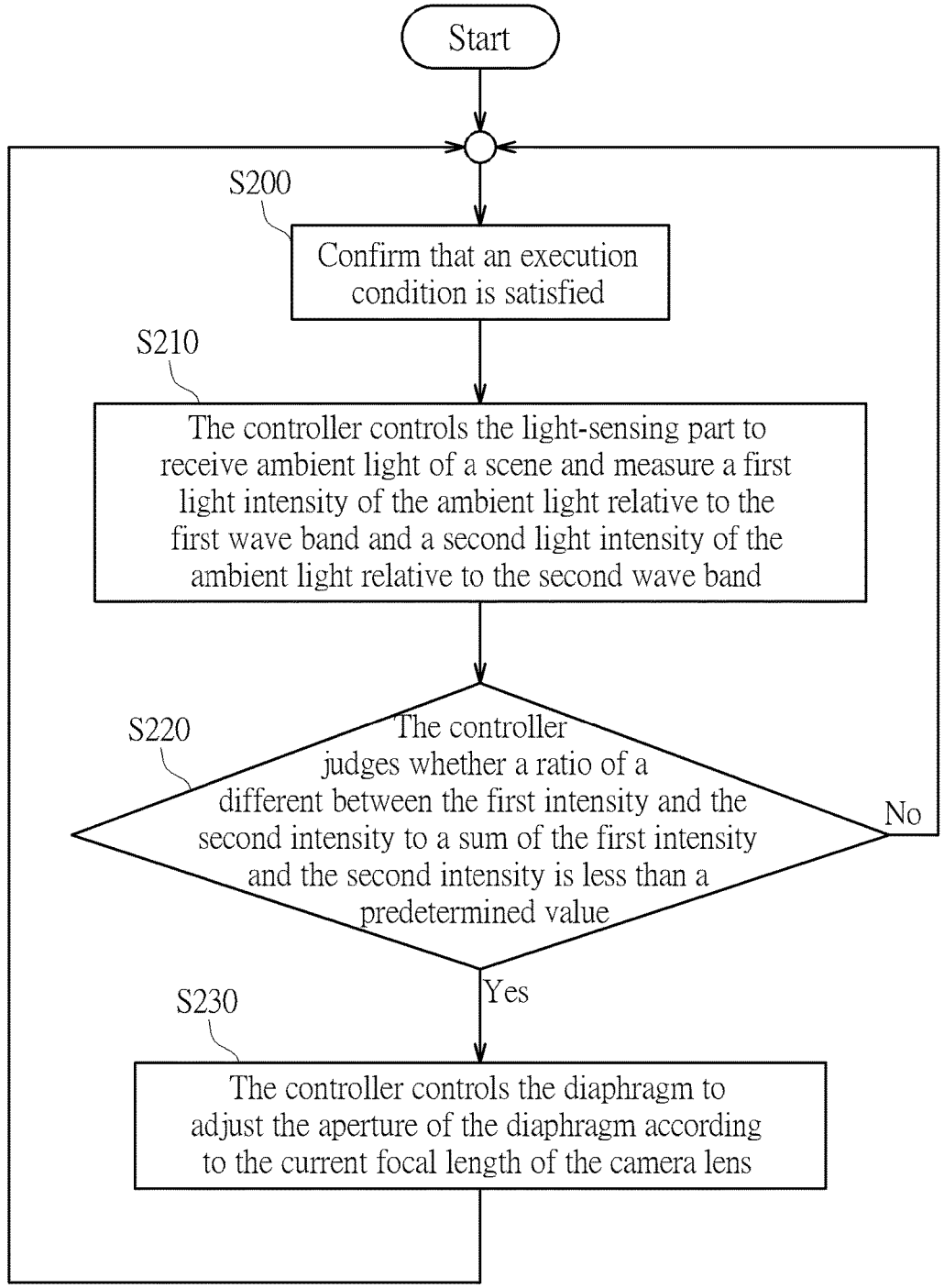
FIG. 5 is a flowchart of the automatically depth-of-field adjusting method according to an embodiment.

Please also refer to FIG. 5. FIG. 5 is a flowchart of the automatically depth-of-field adjusting method according to an embodiment. Similarly, for simplification, the automatically depth-of-field adjusting method shown in FIG. 5 is also practiced on the camera 1. For the relevant descriptions of the camera 1 (including the disposition and action of the components thereof and the variations), please refer to the foregoing and relevant figures, which will not be repeated in addition. As shown by FIG. 5, the automatically depth-of-field adjusting method is executed at predefined time intervals or at least one specific time point. Therefore, the automatically depth-of-field adjusting method is first to confirm that an execution condition is satisfied (e.g. it reaches the predefined time intervals or the specific time point), as shown by the step S200. In practice, the above confirmation for the execution condition can be made by a setting of a counter (corresponding to the execution at the predefined time intervals) or comparing a real time clock with the at least one specific time point stored in a memory (corresponding to the execution at the specific time point).

As shown by FIG. 5, after the execution condition is satisfied, the automatically depth-of-field adjusting method is to use the controller 20 to control the light-sensing part 18 to receive ambient light of a scene and measure a first light intensity of the ambient light relative to the first wave band and a second light intensity of the ambient light relative to the second wave band, as shown by the step S210. In practice, if the filter 184 of the light-sensing part 18 is a band-pass filter (e.g. the band-pass filter of which the transmission spectrum is shown by FIG. 2), the band-pass wave band BP is substantially the same as the second wave band, so in the step S210, the ambient light passes through the band-pass filter to be received by the optical sensor 182 for measuring the second light intensity. For this case, for the measurement of the first light intensity, please refer to the relevant descriptions in the foregoing, which will not be repeated in addition. Furthermore, if the filter 184 of the light-sensing part 18 is a band-stop filter (e.g. the band-stop filter of which the transmission spectrum is shown by FIG. 3), the band-stop wave band BS is substantially the same as the second wave band, so in the step S210, the ambient light passes through the band-stop filter to be received by the optical sensor 182 for measuring the first light intensity. For this case, for the measurement of the second light intensity, please refer to the relevant descriptions in the foregoing, which will not be repeated in addition.

In addition, if the image sensor 16 is also used as the optical sensor 182 of the light-sensing part 18, the controller 20 can control the image sensor 16 and the filter 185 movably disposed above the image sensor 16 so as to measure light intensities of light in different compositions. When the camera 1 continuously records, the camera 1 captures a plurality of successive images of the scene. For this case, in the step S210, the controller 20 determines the first light intensity according to one of the successive images and determines the second light intensity according to another of the successive images. For other descriptions of how the controller 20 controls the location of the filter 185 and selects different portions of the filter 185 (e.g. the filter 185 having one or more filter portions) to make the image sensor 16 capable of receiving light in different compositions, please refer to the relevant descriptions in the foregoing, which will not be repeated in addition.

In addition, similarly, in an actual surveillance application, maybe only one portion of the monitored scene is significant and can be set to be a region of interest. Then, the analysis for the light intensity is executed on the images corresponding to the region of interest. For this case, in the step S210, the controller 20 determines the first light intensity according to an image block of an image of the scene captured by the camera 1; the controller 20 determines the second light intensity according to an image block of another image of the scene captured by the camera 1. Therein, the two image blocks correspond to the same region of interest. For other descriptions of measuring the light intensities through the image blocks, please refer to the relevant descriptions in the foregoing, which will not be repeated in addition.

As shown by FIG. 5, after the first light intensity and the second light intensity are obtained, the automatically depth-of-field adjusting method is to use the controller 20 to judge whether a ratio of a difference between the first intensity and the second intensity to a sum of the first intensity and the second intensity is less than a predetermined value, as shown in the step S220. The predetermined value can be set but not limited to 0.4. For other descriptions of the predetermined value, please refer to the relevant descriptions in the foregoing, which will not be repeated in addition. If the judging result in the step S220 is NO, the flow returns to the step S200 to confirm whether the execution condition is satisfied again, for a next adjustment of the aperture. If the judging result in the step S220 is YES, the controller 20 controls the diaphragm 14 to adjust the aperture of the diaphragm 14 according to the current focal length of the camera lens 12, as shown by the step S230. In practice, the adjustment in the size of the aperture of the diaphragm 14 can be implemented through a look-up table that can be stored in the controller 20 in advance. For other descriptions of the look-up table and looking-up method, please refer to the relevant descriptions in the foregoing, which will not be repeated in addition. Afterward, the flow also returns to the step S200 to confirm whether the execution condition is satisfied again, for a next adjustment of the aperture.

As discussed above, when the visible light and the invisible light received by the camera 1 have no much difference therebetween in intensity, the controller 20 adjusts the aperture of the diaphragm 14 to change the depth of field of the camera lens 12, so that the light relative to every wave bands can form a relatively clear image on the image sensor 16; that is, the controller 20 can obtain a relatively clear image through the image sensor 16. Furthermore, the flowchart in FIG. 5 can be executed repeatedly, which can reach a dynamically adjusting effect.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An automatically depth-of-field adjusting method for a camera, the camera comprising a light-sensing part, a camera lens, a diaphragm, and a controller, the controller being connected to the light-sensing part and the diaphragm, the diaphragm having an aperture corresponding to the camera lens, the light-sensing part being capable of receiving visible light of a first wave band and invisible light of a second wave band, the automatically depth-of-field adjusting method comprising the following steps:
    (a) the controller measuring a first light intensity of ambient light of a scene relative to the first wave band and a second light intensity of the ambient light of the scene relative to the second wave band through the light-sensing part; and
    (b) when the controller determines that a ratio of a difference between the first intensity and the second intensity to a sum of the first intensity and the second intensity is less than a predetermined value, the controller controlling the diaphragm to adjust the aperture according to a current focal length of the camera lens.

2. The automatically depth-of-field adjusting method of claim 1, the light-sensing part comprising an optical sensor and a band-pass filter disposed on the optical sensor, the optical sensor being electrically connected to the controller, a band-pass wave band of the band-pass filter being substantially equal to the second wave band, wherein in the step (a), the ambient light passes through the band-pass filter to be received by the optical sensor for measuring the second light intensity.

3. The automatically depth-of-field adjusting method of claim 1, the light-sensing part comprising an optical sensor and a band-stop filter disposed on the optical sensor, the optical sensor being electrically connected to the controller, a band-stop wave band of the band-stop filter being substantially equal to the second wave band, wherein in the step (a), the ambient light passes through the band-pass filter to be received by the optical sensor for measuring the first light intensity.

4. The automatically depth-of-field adjusting method of claim 1, the light-sensing part comprising an optical sensor and a filter movably disposed on the optical sensor, the optical sensor being an image sensor, the camera capturing a plurality of successive images of the scene, wherein in the step (a), the controller determines the first light intensity according to one of the images and determines the second light intensity according to another of the images.

5. The automatically depth-of-field adjusting method of claim 1, the light-sensing part comprising an optical sensor and a filter movably disposed on the optical sensor, the optical sensor being an image sensor, wherein in the step (a), the controller determines the first light intensity according to a first image block of a first image of the scene captured by the camera, the controller determines the second light intensity according to a second image block of a second image of the scene captured by the camera, and the two image blocks correspond to a same region of interest of the scene.

6. The automatically depth-of-field adjusting method of claim 1, being executed at predefined time intervals or at least one specific time point.

7. A camera, comprising:
    a camera lens;
    a diaphragm, having an aperture corresponding to the camera lens;
    a light-sensing part, capable of receiving visible light of a first wave band and invisible light of a second wave band; and
    a controller, electrically connected to the light-sensing part and the diaphragm, wherein the controller executes an adjusting procedure, and according to the adjusting procedure, the controller measures a first light intensity of ambient light of a scene relative to the first wave band and a second light intensity of the ambient light of the scene relative to the second wave band through the light-sensing part, and when the controller determines that a ratio of a difference between the first intensity and the second intensity to a sum of the first intensity and the second intensity is less than a predetermined value, the controller controls the diaphragm to adjust the aperture according to a current focal length of the camera lens.

8. The camera of claim 7, wherein the light-sensing part comprises an optical sensor and a band-pass filter disposed on the optical sensor, the optical sensor is electrically connected to the controller, a band-pass wave band of the band-pass filter is substantially equal to the second wave band, and the ambient light passes through the band-pass filter to be received by the optical sensor for measuring the second light intensity.

9. The camera of claim 7, wherein the light-sensing part comprises an optical sensor and a band-stop filter disposed on the optical sensor, the optical sensor is electrically connected to the controller, a band-stop wave band of the band-stop filter is substantially equal to the second wave band, and the ambient light passes through the band-pass filter to be received by the optical sensor for measuring the first light intensity.

10. The camera of claim 7, wherein the light-sensing part comprises an optical sensor and a filter movably disposed on the optical sensor, the optical sensor being an image sensor, the controller controls the camera to capture a plurality of successive images of the scene, and the controller determines the first light intensity according to one of the images and determines the second light intensity according to another of the images.

11. The camera of claim 10, further comprising an output interface, connected to the controller, wherein the controller remove the two images, used for determining the first light intensity and the second light intensity, from the successive images and outputs the successive images without the two removed images through the output interface.

12. The camera of claim 7, wherein the light-sensing part comprises an optical sensor and a filter movably disposed on the optical sensor, the optical sensor is an image sensor, the controller controls the image sensor to capture a first image of the scene and determines the first light intensity according to a first image block of the first image of the scene, and the controller controls the image sensor to capture a second image of the scene and determines the second light intensity according to a second image block of the second image of the scene, and the first image block and the second image block correspond to a same region of interest of the scene.

13. The camera of claim 7, wherein the controller executes the adjusting procedure at predefined time intervals or at least one specific time point.

* * * * *